United States Patent
Taniguchi et al.

(10) Patent No.: US 8,665,123 B2
(45) Date of Patent: Mar. 4, 2014

(54) ENCODER HAVING DURABILITY AGAINST VIBRATION OR SHOCK

(75) Inventors: Mitsuyuki Taniguchi, Yamanashi (JP);
Hiroya Terashima, Yamanashi (JP);
Nobuyuki Ootake, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 47 days.

(21) Appl. No.: 13/409,266

(22) Filed: Mar. 1, 2012

(65) Prior Publication Data
US 2012/0229305 A1 Sep. 13, 2012

(30) Foreign Application Priority Data
Mar. 7, 2011 (JP) .................................. 2011-049239

(51) Int. Cl.
*H03M 1/22* (2006.01)

(52) U.S. Cl.
USPC .................................. 341/1; 310/81; 361/748

(58) Field of Classification Search
USPC ...................... 341/1, 15, 16; 310/81; 455/567; 361/762, 761, 748
See application file for complete search history.

(56) References Cited

U.S. PATENT DOCUMENTS

| | | | |
|---|---|---|---|
| 6,778,400 B2* | 8/2004 | Kurle et al. | 361/752 |
| 7,566,238 B2* | 7/2009 | Tracy et al. | 439/382 |
| 2008/0259575 A1* | 10/2008 | Tanimura et al. | 361/749 |
| 2011/0241464 A1* | 10/2011 | Kadowaki et al. | 310/81 |

FOREIGN PATENT DOCUMENTS

| | | |
|---|---|---|
| CN | 1764210 | 4/2006 |
| JP | 1-163385 U | 11/1989 |
| JP | 7243869 A | 9/1995 |
| JP | 2003287025 A | 10/2003 |
| JP | 2004325171 A | 11/2004 |
| JP | 2008003064 A | 1/2008 |
| JP | 2010286452 A | 12/2010 |

OTHER PUBLICATIONS

Office Action corresponding to JP2011-049239, dated Nov. 6, 2012.
Office Action for Chinese patent application No. 201210032994.6 dated May 20, 2013.

* cited by examiner

*Primary Examiner* — Peguy Jean Pierre
(74) *Attorney, Agent, or Firm* — Lowe Hauptman & Ham, LLP

(57) ABSTRACT

A reliable encoder capable of reducing vibration of a printed board when the encoder is subjected to vibration or shock, by means of a simple structure. The encoder has a housing, a rotating code plate arranged in the housing and configured to rotate in synchronization with an object to be measured, a printed board attached to the housing and positioned above the rotating code plate, wherein the encoder has a reinforcing member configured to contact a portion of the printed board where the displacement of the printed board is large while the printed board is resonated due to vibration or shock applied to the encoder.

14 Claims, 3 Drawing Sheets

ENCODER HAVING DURABILITY AGAINST VIBRATION OR SHOCK

RELATED APPLICATIONS

The present application is based on, and claims priority from, Japanese Application Number 2011-049239, filed Mar. 7, 2011, the disclosure of which is hereby incorporated by reference herein in its entirety.

BACKGROUND OF THE INVENTION

1. Field of the Invention

The present invention relates to an encoder attached to an electric motor or an apparatus driven by the electric motor, in particular, to an encoder having durability against vibration or shock.

2. Description of the Related Art

In recent years, an encoder, attached to an electric motor or an apparatus driven by an electric motor, is often used for equipment such as a press machine, wherein excess vibration or shock may be applied to equipment. Since the encoder includes many electronic parts, excess vibration or shock may cause a malfunction or damage the encoder. Therefore, it is desired to improve durability of the encoder by reducing vibration or shock applied to the encoder.

Generally, an encoder has a rotating code plate configured to rotate in synchronization with a detected object such as an electric motor shaft, and a printed board having a detection circuit configured to detect pattern information or the like of the rotating code plate. Since the printed board is positioned above the rotating code plate in many cases, several peripheral portions of the printed board are fixed to a housing by means of a screw or adhesive. In this regard, a technique for improving the rigidity of the housing has been proposed. For example, Japanese Unexamined Patent Publication (Kokai) No. 2008-3064 discloses a technique for improving the rigidity of a board fixing member 7 by gradually increasing an inner diameter of fixing member 7 toward a board 6.

However, when excess vibration or shock is applied to the encoder, a center portion of the printed board may be widely vibrated, and a malfunction or breakage may occur in electric parts or the like mounted to the center portion. As such, in order to improve the durability of the encoder against vibration or shock, it is desired to reduce the vibration of the center portion of the printed board. As a technique for solving the problem, Japanese Unexamined Patent Publication (Kokai) No. 2004-325171 discloses an acceleration sensor arranged in an encoder wherein shock is reduced by accelerating the encoder in the inverse direction, Japanese Unexamined Patent Publication (Kokai) No. 7-243869 discloses a technique for fixing an encoder via a vibration-proof spring member (or a leaf spring), and Japanese Unexamined Patent Publication (Kokai) No. 2003-287025 discloses a technique for using resin to harden a portion, vibration resistance of which should be improved.

Further, in Japanese Unexamined Patent Publication (Kokai) No. 2010-286452, a print board 5 is supported by a board supporting piece 9 made from a vibration proof material, such as rubber, in order to reduce the vibration.

In the method of Japanese Unexamined Patent Publication (Kokai) No. 2004-325171 or Japanese Unexamined Patent Publication (Kokai) No. 7-243869, it is necessary to arrange the acceleration sensor, a complicated processing circuit or the leaf spring in the encoder, and thus the encoder becomes expensive and/or difficult to be made compact. Further, in the method of Japanese Unexamined Patent Publication (Kokai) No. 2003-287025, it requires a huge amount of effort and cost to reinforce the portion of the encoder by resin, and thus the cost of the encoder may be increased and/or production efficiency of the encoder may be decreased.

SUMMARY OF THE INVENTION

An object of the present invention is to provide a reliable encoder capable of reducing vibration of a printed board when the encoder is subjected to vibration or shock, by means of a simple structure.

Accordingly, the invention provides an encoder comprising a housing, a rotating code plate arranged in the housing and configured to rotate in synchronization with an object to be measured, a printed board attached to the housing and positioned above the rotating code plate, wherein the encoder comprises a reinforcing member configured to contact a portion of the printed board which is other than a peripheral portion of the printed board so that a vibration node is formed at the portion of the printed board where the reinforcing member contacts, in order to reduce vibration due to resonance of the printed board.

In a preferred embodiment, the reinforcing member has a printed board contacting portion configured to contact the printed board, a first rod or plate portion connected to an upper end of the printed board contacting portion and outwardly extending in a radial direction of the printed board, and a second rod or plate member connected to a radial outer end of the first rod or plate member and upwardly extending, and wherein the first rod or plate member is deformed due to a reactive force generated by the contact between the printed board contacting portion and the printed board, the second rod or plate member is pressed against a cover for protecting the encoder, whereby the reinforcing member is held so as not to move relative to the cover.

In another preferred embodiment, the reinforcing member has at least one column portion fixed to the housing or the printed board, a beam portion extending from the column portion to above the center portion of the printed board, and at least one auxiliary member arranged on the beam portion and configured to contact the portion of the printed board which is other than the peripheral portion of the printed board.

In still another preferred embodiment, the reinforcing member is directly attached to a cover for protecting the encoder.

It is preferable that a portion of the reinforcing member contacting the printed board is made from engineering plastic, ceramic or metal.

A portion of the reinforcing member contacting the printed board may have a pin, plate or sphere shape.

The beam portion may be configured as a rod or a plate.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
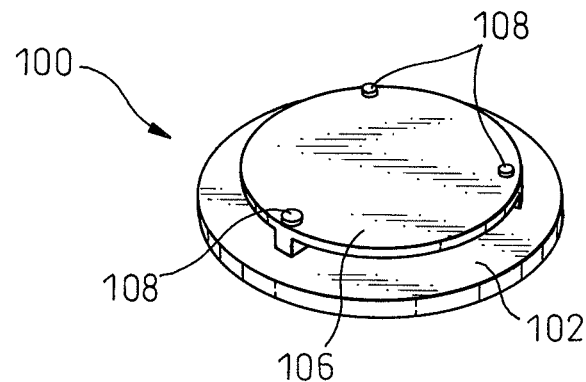
FIG. 1 is a perspective view of a schematic configuration of an encoder of the prior art.
Figure 2:
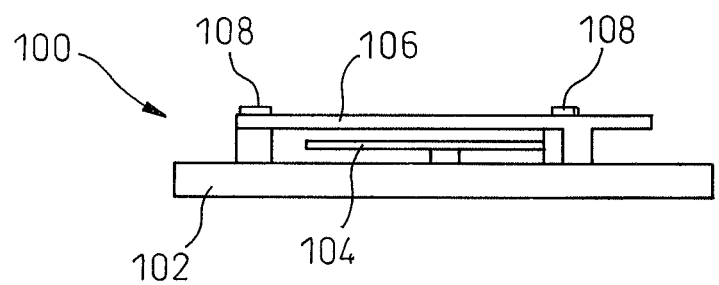
FIG. 2 is a side view of the encoder of FIG. 1.

FIGS. 1 and 2 show perspective and side views, respectively, showing a schematic configuration of an encoder 100 of the prior art. Encoder 100 has a housing 102, a rotating code plate 104 arranged in housing 102 and configured to rotate in synchronization with a rotating part of an object to be measured (not shown) such as an electric motor, and a printed board 106 attached to housing 102 and positioned above rotating code plate 104.

Figure 3:
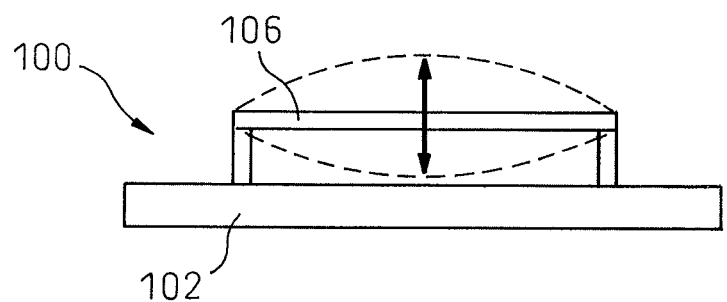
FIG. 3 is a view explaining a state wherein a printed board of the encoder is vibrated.

As shown in FIGS. 1 and 2, in many cases, printed board 106 is positioned above rotating code plate 104. Therefore, several peripheral portions of printed board 106 are fixed to housing 102 by means of screws 108 or adhesives. When excess vibration or shock is applied to the encoder, as shown in FIG. 3 schematically showing a side view of encoder 100, printed board 106 (in particular, the center portion thereof) is widely vibrated, electronic parts or the like (not shown) mounted at the center portion of the printed board may be damaged or broken due to the vibration. As such, in order to improve the durability of the encoder against the vibration or shock, it is necessary to reduce the vibration (or the vibrational amplitude) of the printed board when resonating.

Figure 4:
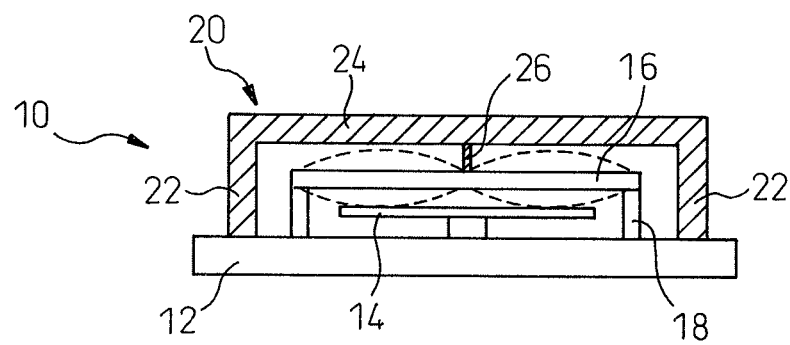
FIG. 4 is a side view of a schematic configuration of an encoder according to a first embodiment of the present invention.

FIG. 4 shows a schematic configuration of an encoder 10 according to a first embodiment of the present invention. The illustrated encoder 10 is configured to detect a rotational angular position of an object to be measured, i.e., an electric motor or a driven body rotated by the electric motor (not shown). Encoder 10 has a housing 12, a generally disc-shaped rotating code plate 14 arranged in housing 12 and configured to rotate in synchronization with a rotating part of the object to be measured (not shown), and a printed board 16 attached to housing 12 and positioned above code plate 14 (or on the opposite side of the object to be measured). Printed board 16 has a generally disc-shape having a diameter larger than a diameter of code plate 14, and is supported by a support 18 arranged outside of an outer peripheral edge of code plate 14 so that printed board 16 is upwardly spaced from code plate 14. An electric part including an optical element or the like (not shown), configured to detect the rotational angular position of code plate 14, is mounted on printed board 16. An output from the electric part is processed by a processing circuit or the like (not shown) so that the rotational angular position and/or a rotational speed of the object to be measured may be detected.

Encoder 10 of the first embodiment, as shown in FIG. 4, has a reinforcing member 20 configured to contact a portion of printed board 16 other than the peripheral portion of printed board 16, i.e., where the displacement of printed board 16 is large (typically, the center of the generally disc-shape) during the printed board is resonated due to the vibration or shock applied to the encoder. Reinforcing member 20 has a generally both-end supported beam. In detail, reinforcing member 20 has two column portions 22 arranged on opposing portions of housing 12 where is positioned outside of the peripheral edge of printed board 16, by means of screws, adhesives or fitting. Reinforcing member 20 further has a beam portion 24 extending from an upper end of one of column portions 22 to an upper end of the other of column portion 22 through an area above the center of printed board 16, and an auxiliary member 26 downwardly extending from the generally center of beam portion 24 and contacting a portion of printed board 16 which is other than the peripheral portion of printed board 16 (for example, the center of printed board 16). For example, beam portion 24 is a rod-shaped or plate-shaped member, and auxiliary member 26 is a pin-shaped member, as shown in FIG. 4. However, auxiliary member 26 may be a sphere member or a plate member extending perpendicular to a surface of a paper of FIG. 4, as long as the auxiliary member contacts the portion of the generally disc-shaped printed board which is other than the peripheral portion thereof.

It is preferable that auxiliary member 26 contacts a portion of printed board 16 (the center of the printed board in the drawing) where the displacement of printed board 16 during resonating is maximum when auxiliary member 26 does not exist. When vibration or shock is supplied to encoder 10 having such a configuration, the center of printed board 16 becomes a node of the vibration during resonating, as indicated by a dotted line in FIG. 4, since auxiliary member 26 contacts printed board 16. Therefore, the vibration during resonating may be significantly reduced. In this case, an antinode is generated between the center and the peripheral portion of printed board 16. However, in this case, a resonant frequency of the vibration is higher than the case of FIG. 3, and the displacement during resonating is smaller than the case of FIG. 3. Therefore, an adverse effect on the electronic part or the like mounted on printed board 16 may be minimized.

Figure 5:
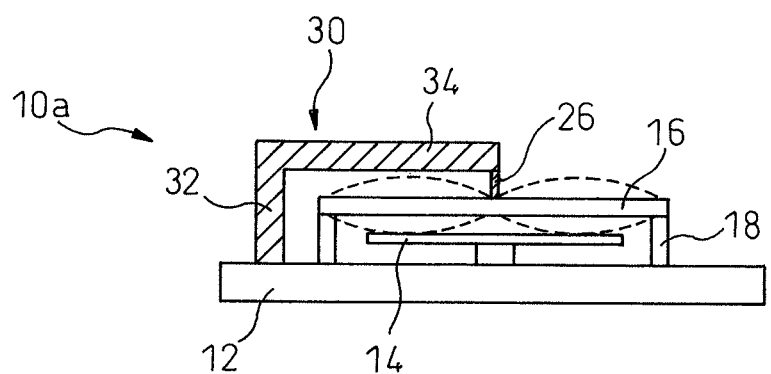
FIG. 5 is a side view of a schematic configuration of an encoder according to a second embodiment of the present invention.

FIG. 5 shows a schematic configuration of an encoder 10a according to a second embodiment of the present invention. The same reference numerals are added to components of encoder 10a similar to the components of the first embodiment of FIG. 4, and a detailed explanation thereof will be omitted.

In the second embodiment, a reinforcing member 30 has a generally cantilever shape. In detail, reinforcing member 30 has a column portion 32 arranged on housing 12 where is positioned outside of the peripheral edge of printed board 16, by means of a screw, adhesive or fitting. Reinforcing member 30 further has a beam portion 34 extending from an upper end of one of column portions 22 to an area above the center of printed board 16, and auxiliary member 26 downwardly extending from a front end of beam portion 34 and contacting a portion of printed board 16 which is other than the peripheral portion of printed board 16 (for example, the center of printed board 16). In such a configuration, reinforcing member 30 also has the same function as the first embodiment.

Figure 6:
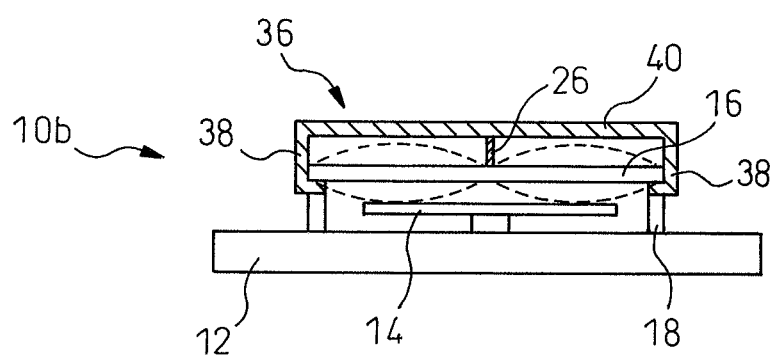
FIG. 6 is a side view of a schematic configuration of an encoder according to a third embodiment of the present invention.

FIG. 6 shows a schematic configuration of an encoder 10b according to a third embodiment of the present invention. The same reference numerals are added to components of encoder 10a similar to the components of the first embodiment of FIG. 4, and a detailed explanation thereof will be omitted.

The third embodiment is similar to the first embodiment, but is different from the first embodiment in that a reinforcing member 36, having a generally both-end supported beam, is not connected to housing 12, but is connected to the peripheral portion of printed board 16 or support 18 which supports printed board 16. In other words, reinforcing member 36 has two column portions 38 arranged on the peripheral portions of printed board 16 or the upper portions of support 18 which are opposed in relation to the center of printed board 16, by means of screws, adhesives or fitting. Reinforcing member 36 further has a beam portion 40 extending from an upper end of one of column portions 38 to an upper end of the other of column portion 38 through an area above the center of printed board 16, and an auxiliary member 26 downwardly extending from the generally center of beam portion 40 and contacting a portion of printed board 16 which is other than the peripheral portion of printed board 16 (for example, the center of printed board 16). In such a configuration, reinforcing member 36 also has the same function as the first embodiment, and may be more compact in comparison to reinforcing member 20 of the first embodiment.

Figure 7:
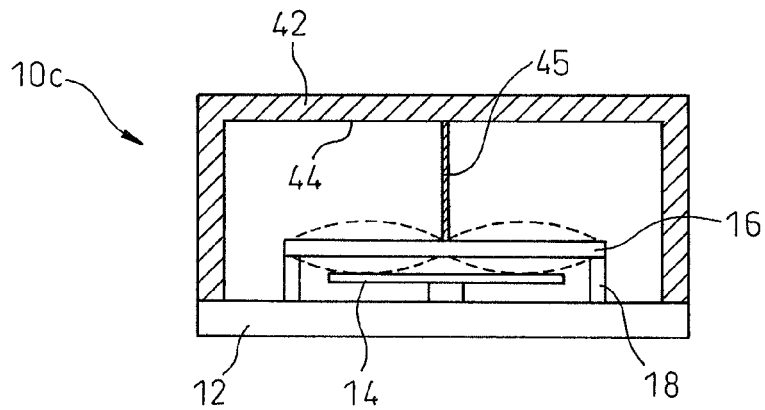
FIG. 7 is a side view of a schematic configuration of an encoder according to a fourth embodiment of the present invention.

FIG. 7 shows a schematic configuration of an encoder 10c according to a fourth embodiment of the present invention. The same reference numerals are added to components of encoder 10a similar to the components of the first embodiment of FIG. 4, and a detailed explanation thereof will be omitted.

Encoder 10c, according to the fourth embodiment as shown in FIG. 7, has a cover 42 attached to housing 12 and configured to cover and protect printed board 16. When viewed in a planar view, cover 42 is larger than printed board 16, and preferably has the same dimension as housing 12. Cover 42 is positioned above printed board 16 so that the distance between cover 42 and printed board 16 is larger than the height (or the vertical distance in FIG. 4) of printed board 16 on housing 12.

On the other hand, reinforcing member 45 is attached to the generally center of a lower surface 44 of cover 42, and configured to contact a portion of printed board 16 (the center of the disc-shape in the drawing) where the displacement of printed board 16, during resonating due to vibration or shock applied to the encoder, is maximum. For example, reinforcing member 45 is a pin-shaped member, as shown in FIG. 7. Otherwise, reinforcing member 45 may be a sphere member or a plate member extending perpendicular to a surface of a paper of FIG. 7, as long as reinforcing member 45 contacts the portion (for example, the center) of the generally disc-shaped printed board which is other than the peripheral portion thereof. In such a configuration, reinforcing member 45 also has the same function as the first embodiment.

Figure 8:
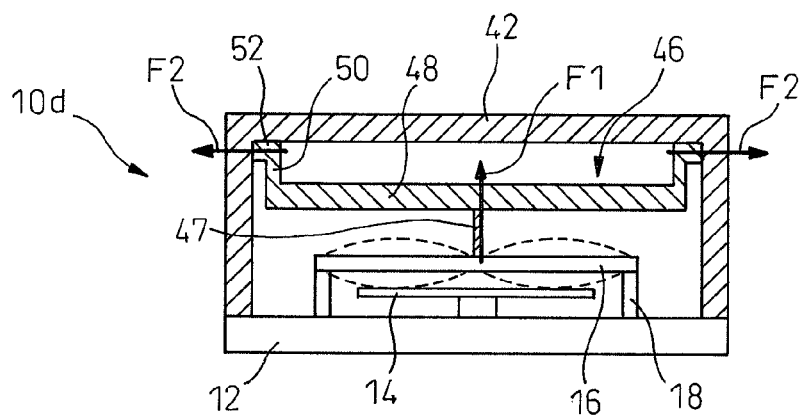
FIG. 8 is a side view of a schematic configuration of an encoder according to a fifth embodiment of the present invention.

When encoder 10c has cover 42 as in the fourth embodiment, by attaching reinforcing member 45 to the inner surface (lower surface 44) of cover 42, support members, such as the column portion and/or the beam portion as explained in the first, second and third embodiments, may be omitted. FIG. 8 shows a schematic configuration of an encoder 10d according to a fifth embodiment of the present invention. The same reference numerals are added to components of encoder 10a similar to the components of the first embodiment of FIG. 4, and a detailed explanation thereof will be omitted.

The fifth embodiment is similar to the first embodiment in that the encoder has a cover. However, a reinforcing member 46 of the fifth embodiment does not have a simple shape such as a pin, a sphere or a plate, but is connected to deform by a reactive force generated by the contact between reinforcing member 46 and printed board 16 so that the deformed portion is pressed against the cover, whereby the reinforcing member is held so as not to move relative to the cover, as explained below.

Figure 9A:
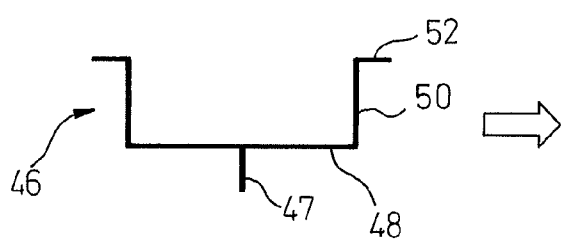
FIG. 9a is a view showing a state before a reinforcing member is deformed in the fifth embodiment.

As shown in FIG. 8, reinforcing member 46 has a printed board contacting portion 47 which is a pin, a sphere or a plate configured to contact a portion (for example, the center) of printed board 16 where is positioned outside of the peripheral edge of printed board 16. Further, reinforcing member 46 has a first rod or plate portion 48 connected to an upper portion (an end portion opposed to the printed board) of printed board contacting portion 47 and extending toward radially outside of printed board 16, and a second rod or plate portion 50 connected to the radially outer end of first rod or plate portion 48 and extending in the upper direction (or the direction opposed to the printed board). As shown in FIGS. 8 and 9a, reinforcing member 46 has a generally C-shape or U-shape having an opening when view in a side view. In addition, reinforcing member 46 may have a third rod or plate portion 52 extending from an upper portion of second rod or plate portion 50 toward radially outside of printed board 16.

Figure 9B:
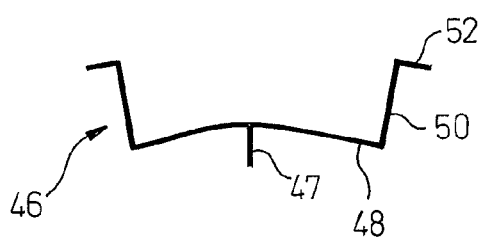
FIG. 9b is a view showing a state after the reinforcing member is deformed.

As shown in FIG. 8, printed board contacting portion 47 of reinforcing member 46 is subjected to a reactive force F1 from printed board 16 during contacting printed board 16. Due to reactive force F1, as shown in FIG. 9b, first rod or plate portion 48 is bent so that a portion thereof connected to printed board contacting portion 47 is mostly upwardly displaced, whereby second rod or plate portion 50 and third rod or plate portion 52 are radially outwardly displaced. Due to the displacement, as shown in FIG. 8, the upper portion of second rod or plate portion 50 (or third rod or plate portion 52) is pressed against the inner surface of cover 42 and a pressure F2 is generated. Due to pressure F2, reinforcing member 46 is held so as not to move relative to cover 42. In other words, in the fifth embodiment, reinforcing member 46 is deformed by the reactive force from printed board 16, and held by cover 42. Therefore, it is not necessary to provide a means for fixing reinforcing member 46 to the housing or the cover. Further, the productivity of the encoder is not decreased since it is not necessary to reinforce the components of the encoder by using resin or the like.

Reinforcing member 46 of the fifth embodiment also has the same function as the first embodiment. In order to preferably generate pressure F2 as described above, the dimension of second rod or plate portion 50 (or third rod or plate portion 52) is determined so that second rod or plate portion 50 (or third rod or plate portion 52) is slightly separated from or lightly contacts the inner surface of cover 42 in the radial direction of printed board 16 when reactive force F1 is not generated (FIG. 9a), and so that second rod or plate portion 50 (or third rod or plate portion 52) is pressed against the inner surface of cover 42 to generate pressure F2 when reactive force F1 is generated (FIG. 9b).

When the reinforcing member does not exist, the printed board is vibrated as indicated by the dotted line in FIG. 3. In this case, the amplitude of the vibration is maximum at the center of the printed board. Therefore, it is preferable that the reinforcing member or the auxiliary member contacts the center or the near of printed board 16, as shown in the above embodiments. However, the portion of the printed board, where the reinforcing member or the auxiliary member contacts, is not limited to the center of the printed board. As long as the reinforcing member or the auxiliary member contacts the portion of the printed board (concretely, the radially inside portion of printed board 16 relative to the portion supported by support 18 as shown in FIG. 4) which is other than the peripheral portion thereof, the node of the vibration is formed at the contact portion, whereby a certain effect in reducing the vibration may be obtained. For example, auxiliary member 26 of reinforcing member 20 as shown in FIG. 4 may contact a portion of printed board 16 which is separated from the center (or the gravity center) of the printed board by a distance of $1/3$, $1/4$, $1/5$ or $1/6$ or less of a dimension (e.g., the diameter if the printed board is circular, or the length of a diagonal line if the printed board is rectangular) of printed board in the direction perpendicular to the vibratory direction of printed board 16 (the horizontal direction in FIG. 4). Further, a plurality of reinforcing members or auxiliary members may be used so that the members contact a plurality of portions of the printed board other than the peripheral portion, since the number of the node is increased and the displacement during resonating is decreased.

In the first to fifth embodiments, the reinforcing member or the auxiliary member contacts the printed board so as to form the node of vibration at the contact point and reduce the vibration when resonating. Therefore, it is preferable that the reinforcing member or the auxiliary member is made from a material which has a certain degree of hardness and high mechanical strength, such as metal, ceramic or engineering plastic, and not soft material such as rubber.

As described above, the encoder of the present invention has the reinforcing member configured to reduce the vibration of the printed board during resonating. The reinforcing member is fixed to the cover, the hosing or the printed board, and configured to contact the portion of the printed board so as to reduce the vibration displacement of the contact point of the printed board during resonating. When the vibration or shock is applied to the encoder having such a configuration, the contact point between the reinforcing member and the printed board functions as the node of vibration, whereby the vibration when resonating is significantly reduced. In this regard, the anti-node is generated between the contact point and the peripheral portion. However, in this case, a resonant frequency of the vibration is higher, and the displacement during resonating is smaller, in comparison to than a case wherein the reinforcing member is not provided. Therefore, an adverse effect on the electronic part or the like may be minimized.

When the reinforcing member is used, it is not necessary to use a complicated circuit for an acceleration sensor or the like. In addition, the reinforcing member may have a simple structure which is fixed by the screw or held by the reactive force for pressing the printed board Therefore, it is not necessary to reinforce the encoder by resin, and thus the production efficiency of the encoder is not decreased. By using such a simple reinforcing member, the vibration of the center of the printed board may be limited, and thus the durability of the encoder against the vibration or shock may be improved by a simple and inexpensive structure.

The encoder as disclosed in Japanese Unexamined Patent Publication (Kokai) No. 2010-286452 (JPP'452) is similar in some degree to the present invention. However, in the encoder of JPP'452, vibrational reduction material having vibrational absorption function, such as rubber, is used for reducing the vibration. On the other hand, in the present invention, high-strength material such as metal is used for generating the node of vibration. Therefore, the present invention is different from JPP'452 in the structure or method for reducing the vibration. Further, in JPP'452, it is necessary to locate the vibrational reduction material between the housing and the printed board, or between the cover and the printed board. On the other hand, the present invention does not require such a location, whereby the encoder may be easily assembled.

According to the present invention, the encoder has the reinforcing member configured to contact the portion of the printed board which is other than the peripheral portion of the printed board. Therefore, when the vibration or shock is applied to the encoder, the portion of the printed board where the reinforcing member contacts becomes the vibration node so that the vibration during resonating is significantly reduced, whereby trouble or damage of electronic parts on the printed board may be prevented.

When the encoder has the cover, by deforming the reinforcing member by the reactive force generated by the contact between the reinforcing member and the printed board, and pressing the deformed portion of the reinforcing member against the cover, the reinforcing member may be properly fixed without using another fixing means.

When the encoder has the cover, by attaching the auxiliary member to the cover, it is not necessary to provide another member for supporting the auxiliary member.

By producing the reinforcing member by using material having a certain degree of hardness, such as engineering plastic, ceramic or metal, the vibration node may be more assuredly formed at the contact point between the printed board and the reinforcing member, whereby the vibration of the printed board during resonating may be significantly reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An encoder comprising a housing, a rotating code plate arranged in the housing and configured to rotate in synchronization with an object to be measured, a printed board attached to the housing and positioned above the rotating code plate,
wherein the encoder comprises a reinforcing member configured to contact a portion of the printed board which is other than a peripheral portion of the printed board so that a vibration node is formed at the portion of the printed board where the reinforcing member contacts, in order to reduce vibration due to resonance of the printed board.

2. The encoder as set forth in claim 1, wherein the reinforcing member has a printed board contacting portion configured to contact the printed board, a first rod or plate portion connected to an upper end of the printed board contacting portion and outwardly extending in a radial direction of the printed board, and a second rod or plate member connected to a radial outer end of the first rod or plate member and upwardly extending,
and wherein the first rod or plate member is deformed due to a reactive force generated by the contact between the printed board contacting portion and the printed board, the second rod or plate member is pressed against a cover for protecting the encoder, whereby the reinforcing member is held so as not to move relative to the cover.

3. The encoder as set forth in claim 1, wherein the reinforcing member has at least one column portion fixed to the housing or the printed board, a beam portion extending from the column portion to above the center portion of the printed board, and at least one auxiliary member arranged on the beam portion and configured to contact the portion of the printed board which is other than the peripheral portion of the printed board.

4. The encoder as set forth in claim 3, wherein the beam portion has a rod or plate shape.

5. The encoder as set forth in claim 1, wherein the reinforcing member is directly attached to a cover for protecting the encoder.

6. The encoder as set forth in claim 1, wherein a portion of the reinforcing member contacting the printed board is made from engineering plastic, ceramic or metal.

7. The encoder as set forth in claim 1, wherein a portion of the reinforcing member contacting the printed board has a pin, plate or sphere shape.

8. An encoder, comprising:
a housing;
a rotating code plate arranged in the housing and configured to rotate in synchronization with an object to be measured;
a printed board attached to the housing and positioned above the rotating code plate; and
a reinforcing member configured to contact a portion of the printed board which is other than a peripheral portion of the printed board so that a vibration node is formed at the portion of the printed board where the reinforcing member contacts, only by the contacts between the reinforcing member and the portion of the printed board, in order to reduce vibration due to resonance of the printed board.

9. The encoder as set forth in claim 8, wherein the reinforcing member has a column portion that is fixedly held by a cover for protecting the encoder and is deformable by a reactive force generated when contacting the printed board, a beam portion extending from the column portion to the center portion of the printed board, and at least one auxiliary member arranged on the beam portion and configured to contact the portion of the printed board which is other than the peripheral portion of the printed board.

10. The encoder as set forth in claim 8, wherein the reinforcing member has at least one column portion fixed to the housing or the printed board, a beam portion extending from the column portion to above the center portion of the printed board, and at least one auxiliary member arranged on the beam portion and configured to contact the portion of the printed board which is other than the peripheral portion of the printed board.

11. The encoder as set forth in claim 10, wherein the beam portion has a rod or plate shape.

12. The encoder as set forth in claim 8, wherein the reinforcing member is directly attached to a cover for protecting the encoder.

13. The encoder as set forth in claim 8, wherein a portion of the reinforcing member contacting the printed board is made from engineering plastic, ceramic or metal.

14. The encoder as set forth in claim 8, wherein a portion of the reinforcing member contacting the printed board has a pin, plate or sphere shape.

\* \* \* \* \*